US007827711B2

(12) United States Patent
Wang et al.

(10) Patent No.: US 7,827,711 B2

(45) Date of Patent: Nov. 9, 2010

(54) AUTOMATIC ROTATING DECORATION

(76) Inventors: XiaoBing Wang, A1401, Greatwall Building 9, Fu Tian, Shen Zhen (CN); LiangQing Li, A1401, Greatwall Building 9, Fu Tian, Shen Zhen (CN)

( * ) Notice: Subject to any disclaimer, the term of this patent is extended or adjusted under 35 U.S.C. 154(b) by 463 days.

(21) Appl. No.: 11/905,632

(22) Filed: Oct. 3, 2007

(65) Prior Publication Data

US 2008/0098632 A1 May 1, 2008

(30) Foreign Application Priority Data

Oct. 26, 2006 (CN) .................... 2006 2 0015445 U

(51) Int. Cl.

*G09F 19/00* (2006.01)
*G09F 13/00* (2006.01)
*G09F 19/12* (2006.01)
*G09F 27/00* (2006.01)
*G09B 27/02* (2006.01)

(52) U.S. Cl. ............................. 40/430; 40/429; 40/435; 40/455; 40/409; 40/406; 40/431; 40/414; 40/427; 428/7; 428/11; 434/136

(58) Field of Classification Search .................. 40/430, 40/429, 435, 455, 409, 406, 414, 427, 431; 428/7, 11; 434/136

See application file for complete search history.

(56) References Cited

U.S. PATENT DOCUMENTS 4,545,775 A * 10/1985 Kim ........................... 446/299
4,989,120 A * 1/1991 Davis et al. ................... 362/35

* cited by examiner

*Primary Examiner*—Lesley Morris
*Assistant Examiner*—Syed A Islam
(74) *Attorney, Agent, or Firm*—Jackson IPG PLLC; Demian K. Jackson

(57) ABSTRACT

An automatic rotating decoration includes a rotating body, a support, a driving device connecting the support, and a transmission member connecting the driving device and the rotating body. The support, the driving device and the transmission member all are received in the rotating body. An opening is defined in the rotating body. The support is exposed to the opening. The driving device includes a driving body and an output shaft extending from the driving body. The driving body includes a motor body and a battery seat electrically connecting the motor body. The automatic rotating decoration of the present invention may automatically rotate around the support on another object without additional housing thereby simplifying the structure of the automatic rotating decoration, increasing fun of the automatic rotating decoration and facilitating the handling.

2 Claims, 12 Drawing Sheets

AUTOMATIC ROTATING DECORATION

FIELD OF THE INVENTION

The present invention relates to a rotating decoration and particularly to an automatic rotating decoration which has a driving device inside a rotating body thereof and a support fixedly connecting with the driving device whereby the rotating body may be driven by the driving device to rotate about the support.

BACKGROUND OF THE INVENTION

With the development of decorations, the decorations are required to be more interesting and funny. Many of fixed decorations are developed in order to be mobile. For example, a traditional fixed globe is improved onto a rotating globe which rotates relatively to a housing. A conventional rotating decoration is installed on a housing and then is set in rotation relatively to the housing by a driving device.

However, since the rotating decoration needs the housing to support it, the design of the rotating decoration is limited by the design of the housing, which adversely affects the funny aspect of the rotating decoration. Furthermore, the housing makes the rotating decoration bigger and this is inconvenient to take in consideration.

SUMMARY OF THE INVENTION

An object of the present invention is to provide an automatic rotating decoration which has a driving device disposed in a rotating body thereof and a support fixedly connecting the driving device and disposed in the rotating body whereby the rotating body may be driven by the driving device to rotate about the support thereby simplifying the structure of the automatic rotating decoration, increasing the fun of the automatic rotating decoration and making easier to handle it.

To achieve the aforementioned object, an automatic rotating decoration includes a rotating body, a support, a driving device connecting the support, and a transmission member connecting the driving device and the rotating body. The support, the driving device and the transmission member all are received in the rotating body. An opening is defined in the rotating body. The support is exposed to the opening. The driving device includes a driving body and an output shaft extending from the driving body. The driving body includes a motor body and a battery seat electrically connecting the motor body.

The automatic rotating decoration of the present invention may automatically rotate around the support on another object without additional housing thereby simplifying the structure of the automatic rotating decoration, increasing fun of the automatic rotating decoration and facilitating the handling.

Other objects, advantages and novel features of the present invention will be drawn from the following detailed embodiment of the present invention with attached drawings, in which:

DESCRIPTION OF THE PREFERRED EMBODIMENTS

Figure 1:
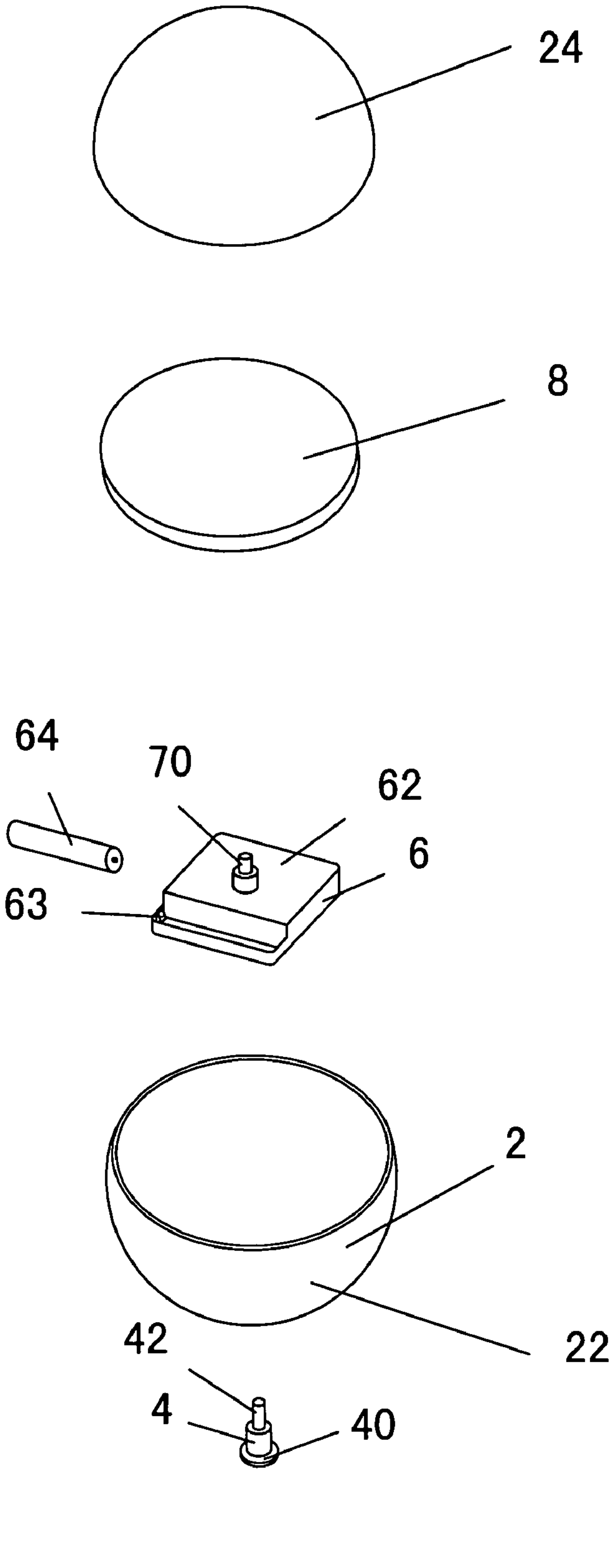
FIG. 1 is an exploded view of an automatic rotating decoration in accordance with a first embodiment of the present invention.
Figure 2:
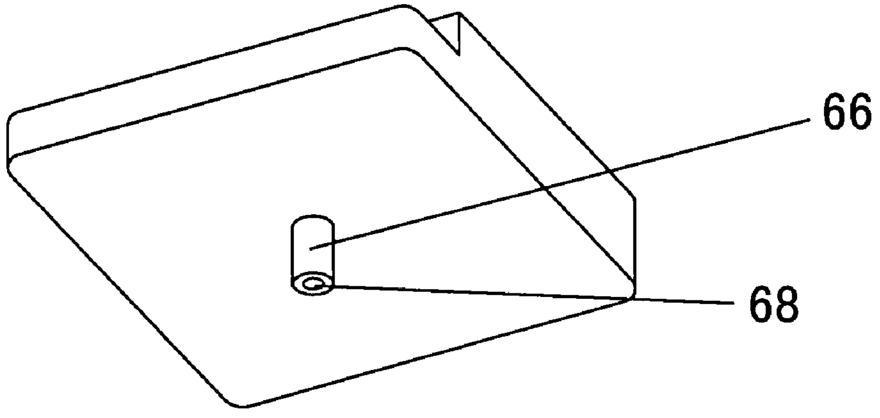
FIG. 2 is a perspective view of a motor of FIG. 1 viewed from another angle.
Figure 3:
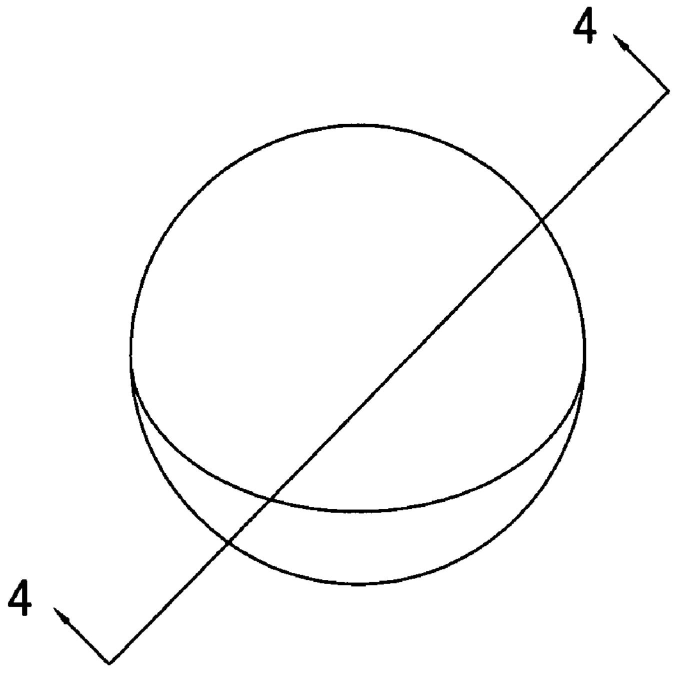
FIG. 3 is an assembled view of FIG. 1.
Figure 4:
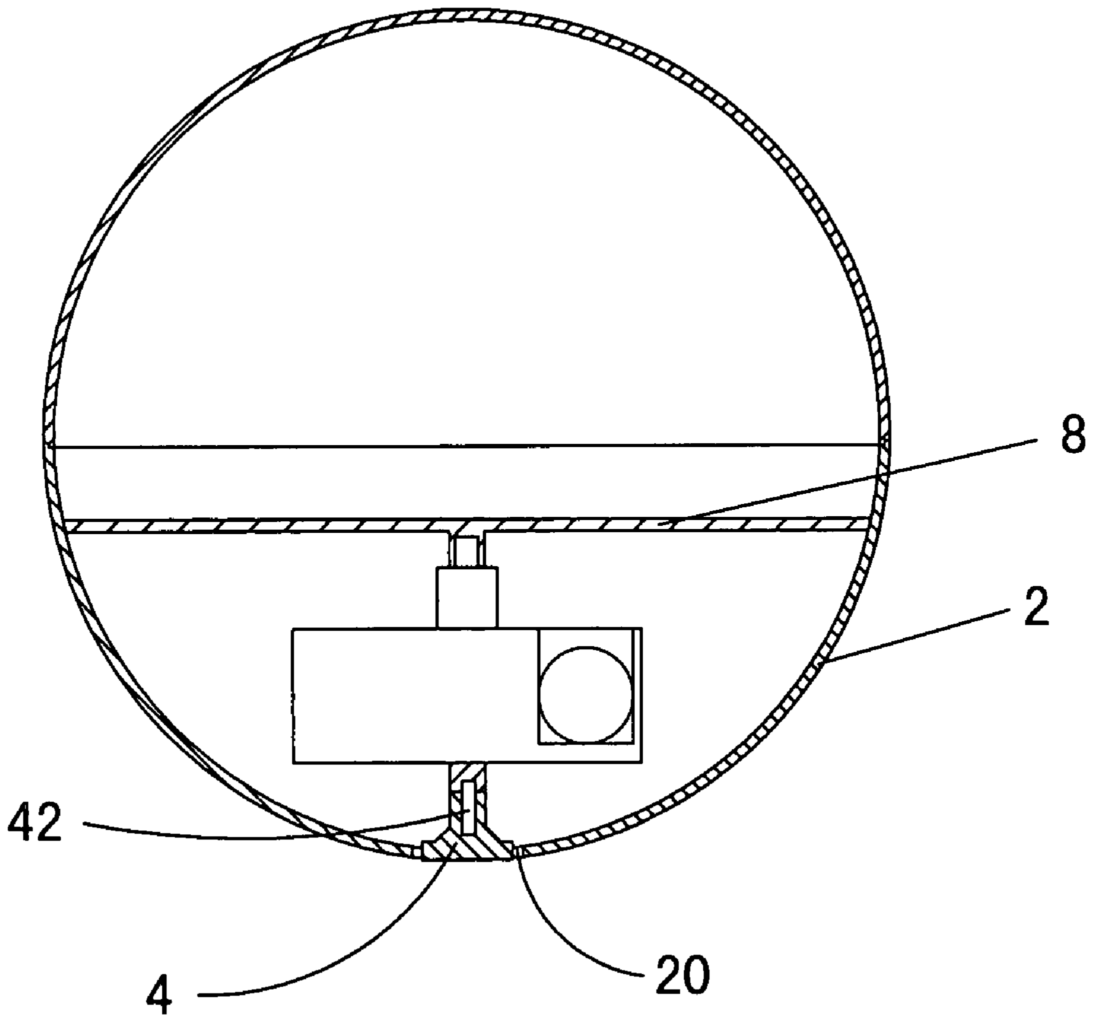
FIG. 4 is a cross sectional view taken along line 4-4 of FIG. 3.

Referring to FIGS. 1-4, an automatic rotating decoration in accordance with a first embodiment of the present invention includes a rotating body 2, a support 4, a driving device 6 connecting the support 4, and a transmission member 8 connecting the driving device 6 and the rotating body 2. The support 4, the driving device 6 and the transmission member 8 all are received in the receiving body 2. An opening 20 is defined in the rotating body 2. The support 4 slightly protrudes from the opening 20 with the protruding outer surface substantially forming a portion of the outer surface of the rotating body 2 thereby achieving completeness of the outer surface of the rotating body 2. In this embodiment, the rotating body 2 is a decorative ball, such as a globe. In alternative embodiments, the rotating body 2 may be any rotating objects, such as figurines, animal models, flower vases or similar things. In this embodiment, the rotating body 2 includes a first casing 22, and a second casing 24 connecting the first casing 22 for receiving the driving device 6 and the transmission member 8 therein.

The support 4 includes a stand 40 and a connecting shaft 42 connecting the stand 40. The stand 40 is received in the opening 20 of the rotating body 2 with no contact. The outer surface of the support 4 exposing to the opening 20 substantially forms a portion of the outer surface of the rotating body 2 thereby achieving the completeness of the outer surface of the rotating body 2. Therefore, the opening 20 does not adversely affect the shape of the rotating body 2. The connecting shaft 42 is fixedly connected to the driving device 6. When the automatic rotating decoration of the present invention is placed on other object to rotate, the rotating body 2 hides the support 4 whereby a user cannot see the support 4 thereby increasing fun of the automatic rotating decoration.

The driving device 6 includes a driving body and an output shaft extending from the driving body. The driving body includes a motor body 62, a battery seat 63 electrically connecting the motor body 62, and a battery 64 installed in the battery seat 63. In this embodiment, the motor body 62 is disposed with a connecting portion 66 on a surface facing the support 4. A connecting hole 68 is defined in the connecting portion 66. The connecting shaft 42 of the support 4 is inserted into the connecting hole 68 of the connecting portion 66 thereby fixing the driving device 6 and the support 4 together. The output shaft 70 is disposed at the motor body 62 opposing the connecting portion 66 and is fixed to the transmission member 8. In this embodiment, the transmission member 8 is in a shape of disk and is fixed to the first casing 22 of the rotating body 2 through glue. The battery 64 may be a dry battery, a rechargeable battery and so on. The motor body 62 may be a gear motor body.

When the motor body 62 is switched on, the output shaft 70 of the motor body 62 makes the transmission member 8 rotate the rotating body 2 around the support 4. Since the support 4 does not, touch directly the rotating body 2, the support 4 doesn't move when the rotating body 2 is set in rotation by the driving device 6. Thus, the automatic rotating decoration of the present invention does not move on another object when the rotating body 2 rotates.

Figure 5:
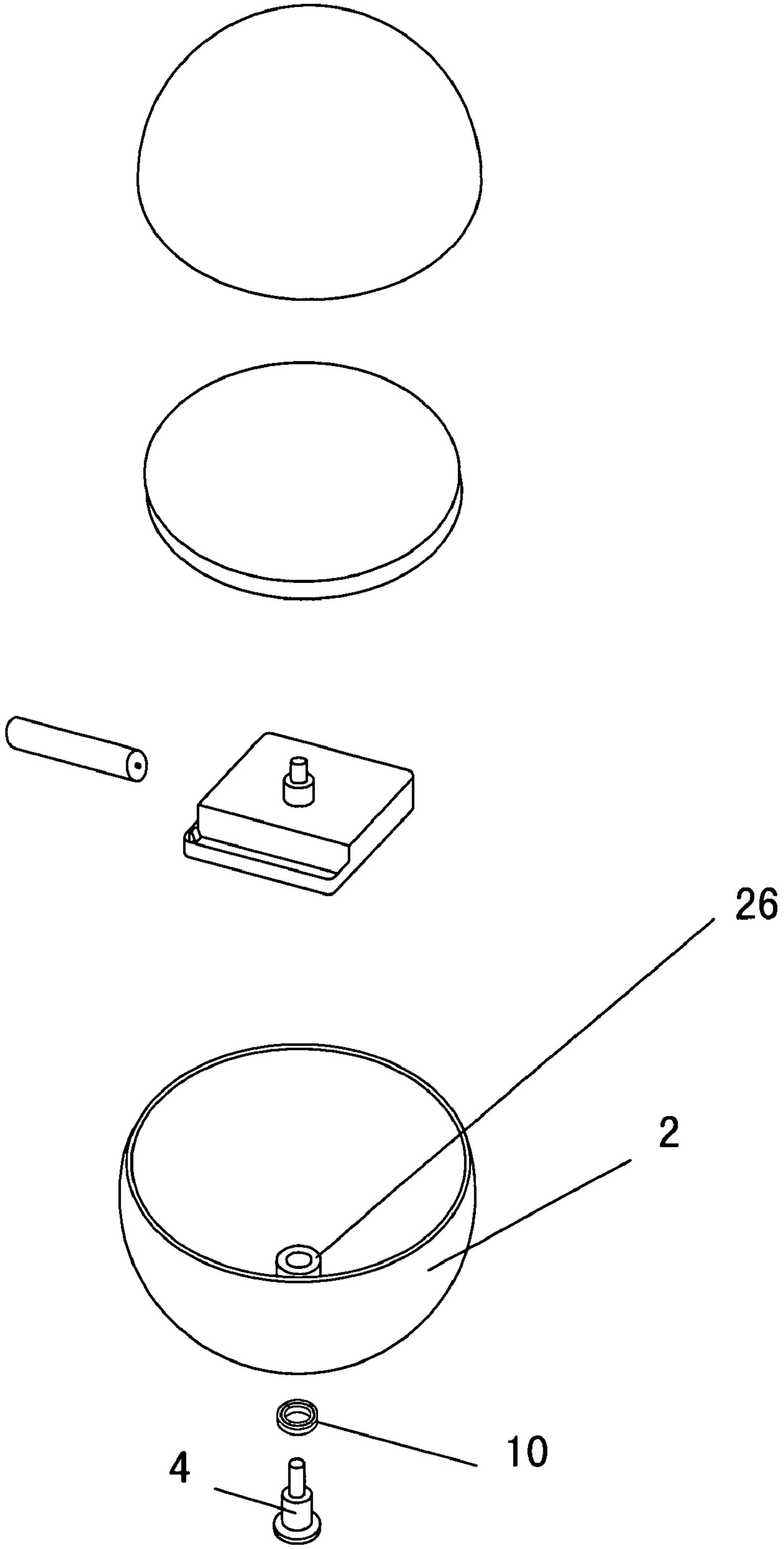
FIG. 5 is an exploded view of an automatic rotating decoration in accordance with a second embodiment of the present invention.
Figure 6:
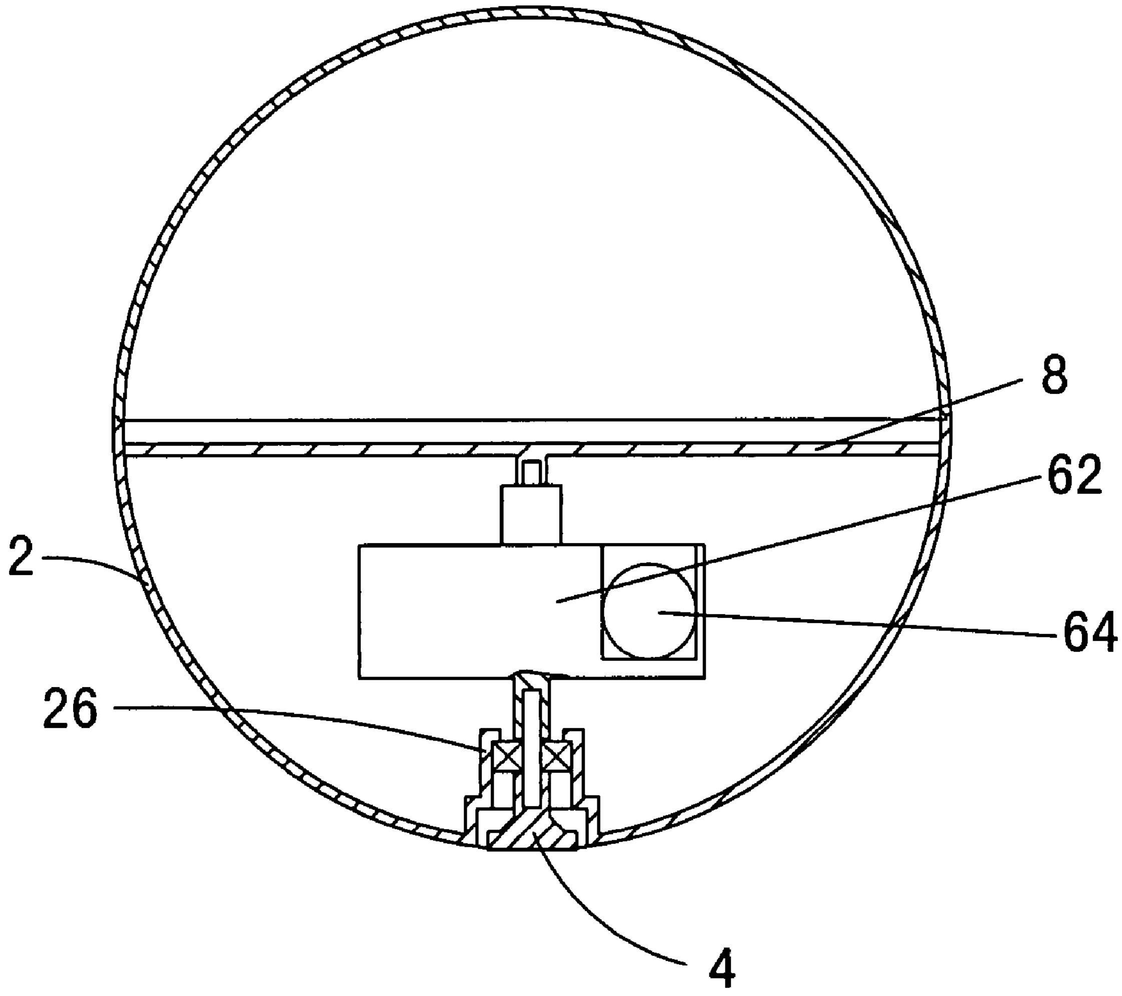
FIG. 6 is a cross sectional view of an assembly of FIG. 5.

Referring to FIGS. 5 and 6, in this embodiment, a mounting seat 26 is disposed in the rotating body 2 corresponding to the opening 20. A bearing 10 is further disposed between the side wall of the mounting seat 26 and the support 4 thereby forming a rotating connection without contact between the rotating body 2 and the support 4 and ensuring the position relationship between the rotating body 2 and the support 4. The bearing 10 may be a sliding bearing or a rolling bearing. The inner ring of the bearing 10 is fixed to the connecting shaft 42 of the support 4 and the outer ring of the bearing 10 is fixed to the side wall of the mounting seat 26.

Figure 7:
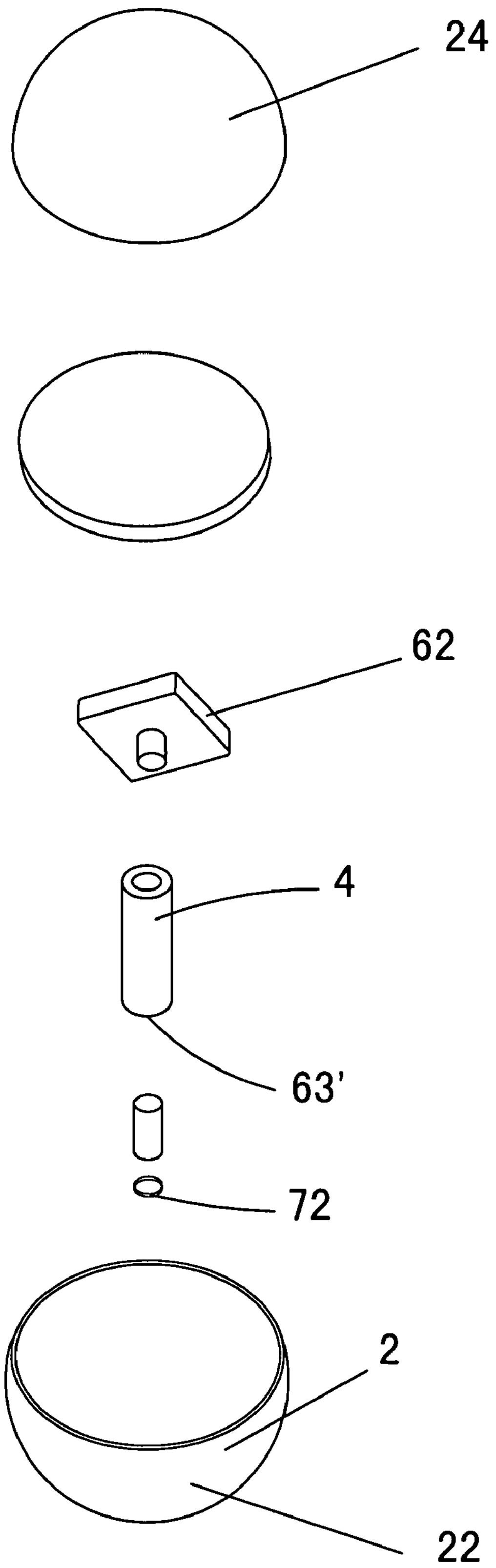
FIG. 7 is an exploded view of an automatic rotating decoration in accordance with a third embodiment of the present invention.
Figure 8:
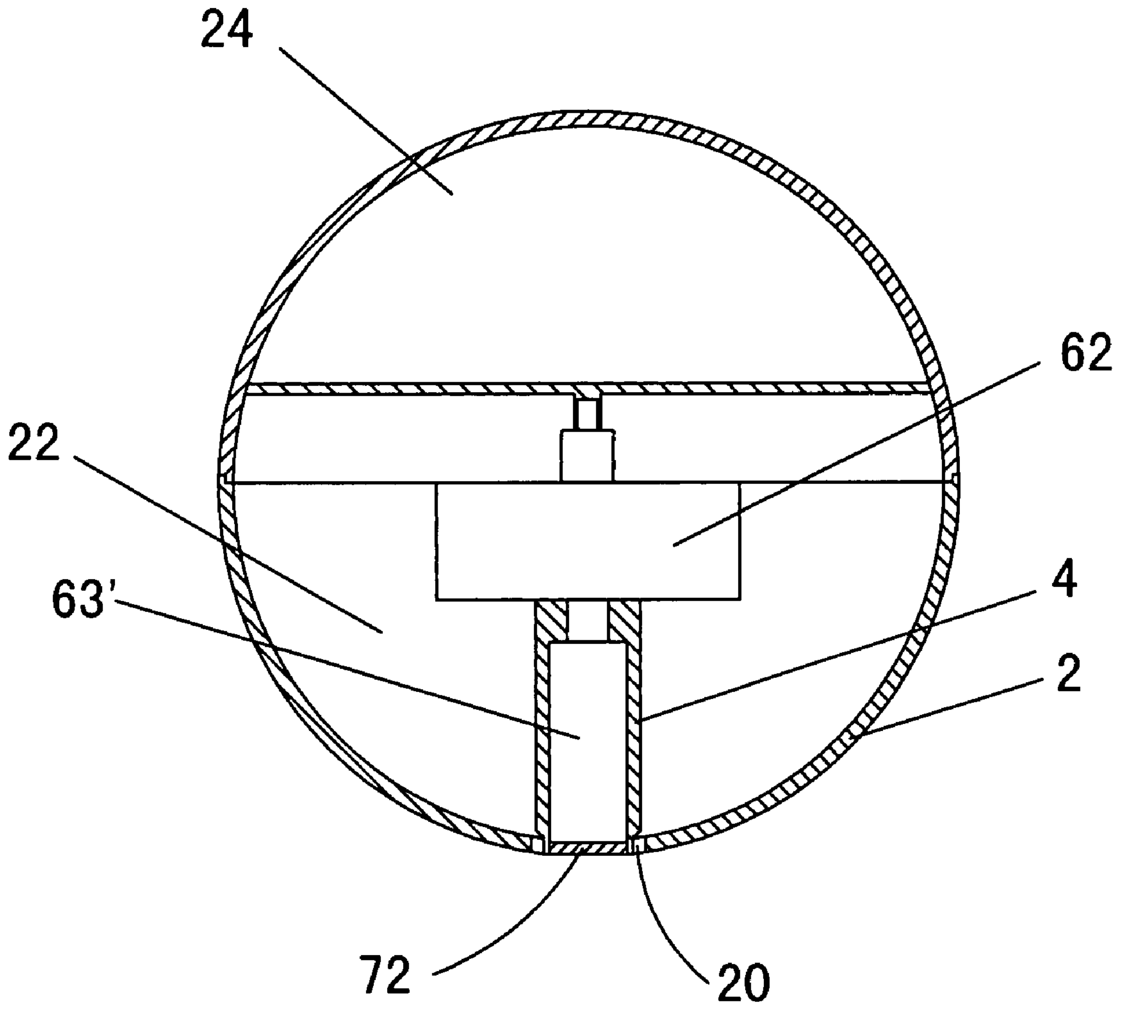
FIG. 8 is a cross sectional view of an assembly of FIG. 7.

Referring to FIGS. 7 and 8, in this embodiment, a battery seat 63' of the driving device 6 is disposed in the support 4. The battery seat 63' may be configured as a conventional battery seat. A cover 72 is disposed at the free end of the support 4 exposing to the opening 20 for facilitating to open the cover to replace battery. The cover 72 connects the battery seat 63' in a conventional manner. The battery seat 63' electrically connects the motor body 62 of the driving body for providing power to the driving device. In this embodiment, since the rotating body is not required to open for replacing battery, the first and second casings 22, 24 can be undetachably fixed.

Figure 9:
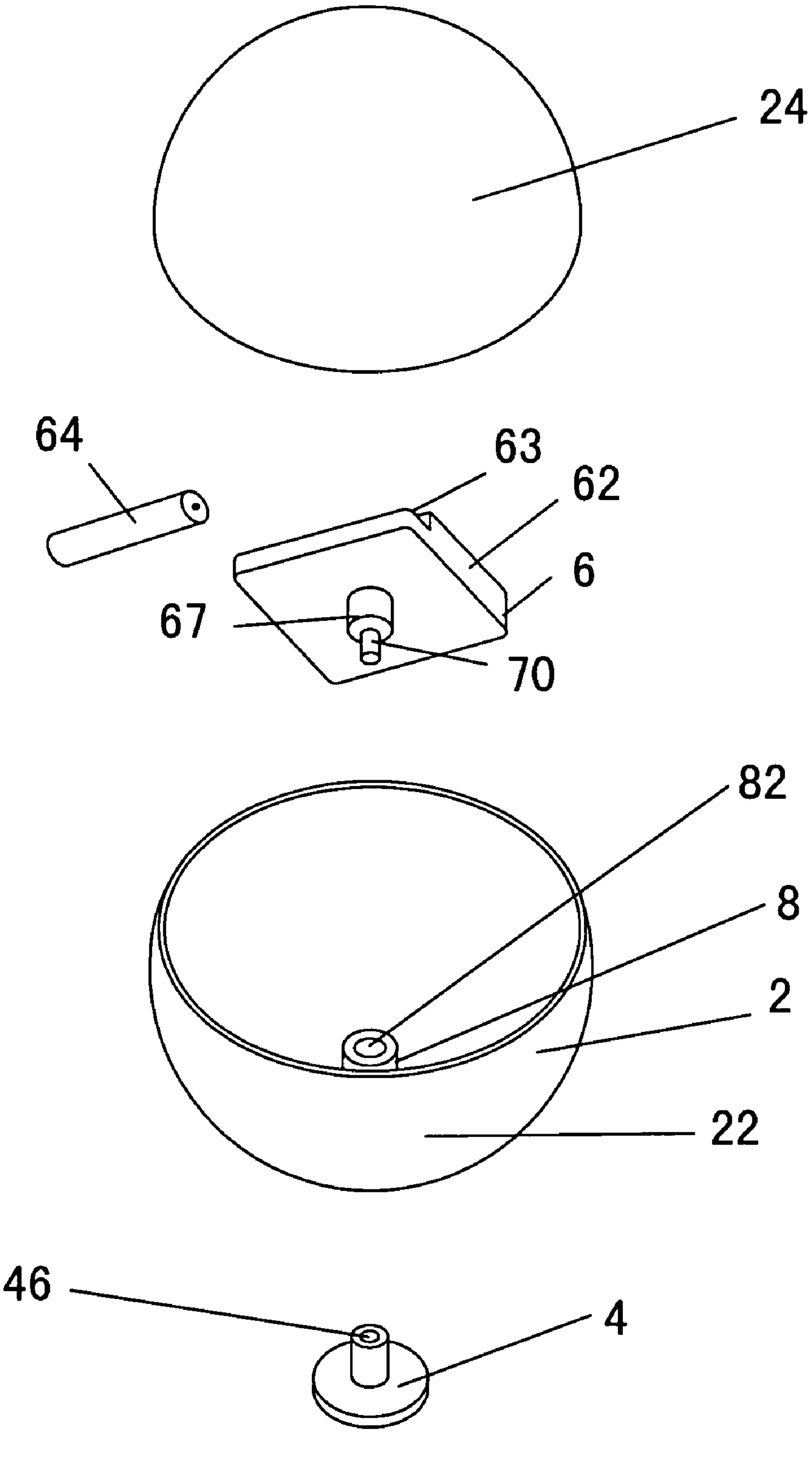
FIG. 9 is an exploded view of an automatic rotating decoration in accordance with a further embodiment of the present invention.
Figure 10:
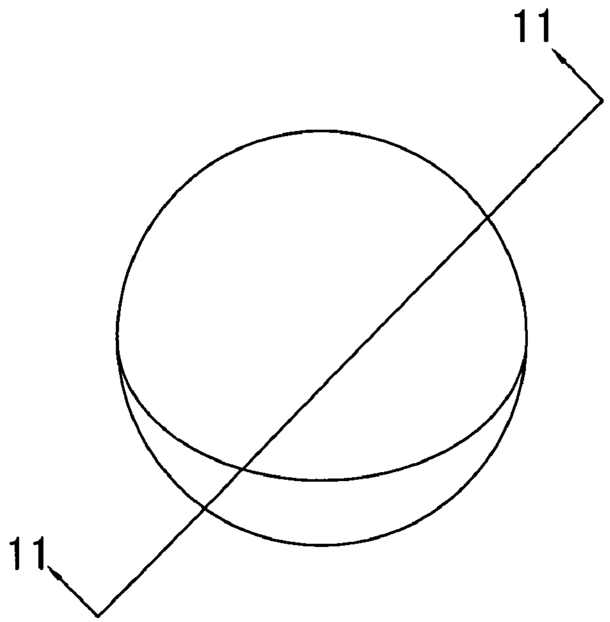
FIG. 10 is an assembled view of FIG. 9.
Figure 11:
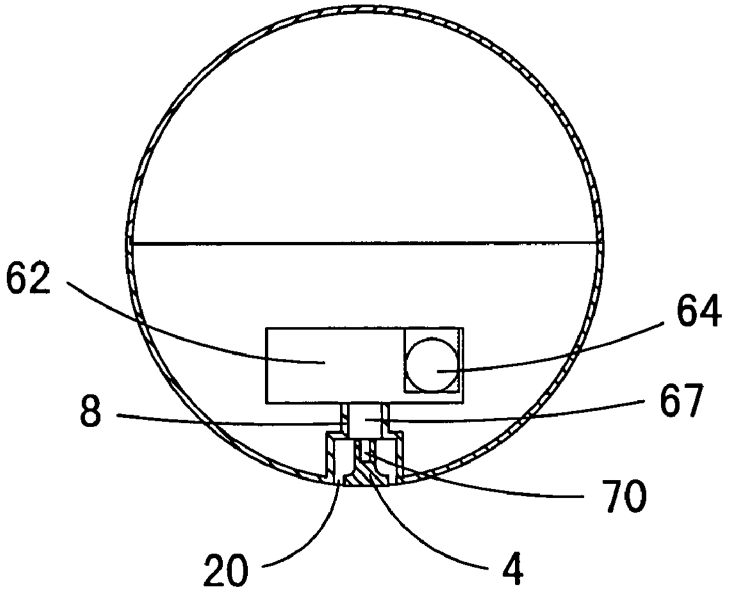
FIG. 11 is a cross sectional view taken along line 11-11 of FIG. 10.

Referring to FIGS. 9-11, an automatic rotating decoration in accordance with a further embodiment of the present invention is illustrated. In this embodiment, the driving body of the driving device 6 is fixed to the transmission member 8. The output shaft 70 is inserted in a fixing hole 46 defined in the support 4 thereby fixing the output shaft 70 and the support 4 together. A protrusion 67 is disposed at the motor body 62 facing the support 4. The protrusion 67 is fixed to the transmission member 8 which is cylindrical with a through hole 82 defined therein for receiving the protrusion 67. The output shaft 70 extends through the protrusion 67 and into the fixing hole 46 of the support 4 thereby fixing the driving device 6 and the support 4.

When the motor body 62 is switched on, the output shaft 70 of the motor body 62 makes the transmission member 8 rotate the rotating body 2 around the support 4. Since the support 4 does not touch directly the rotating body 2, the support 4 doesn't move when the rotating body 2 is set in rotation by the driving device 6. Thus, the automatic rotating decoration of the present invention does not move on another object when the rotating body 2 rotates.

Figure 12:
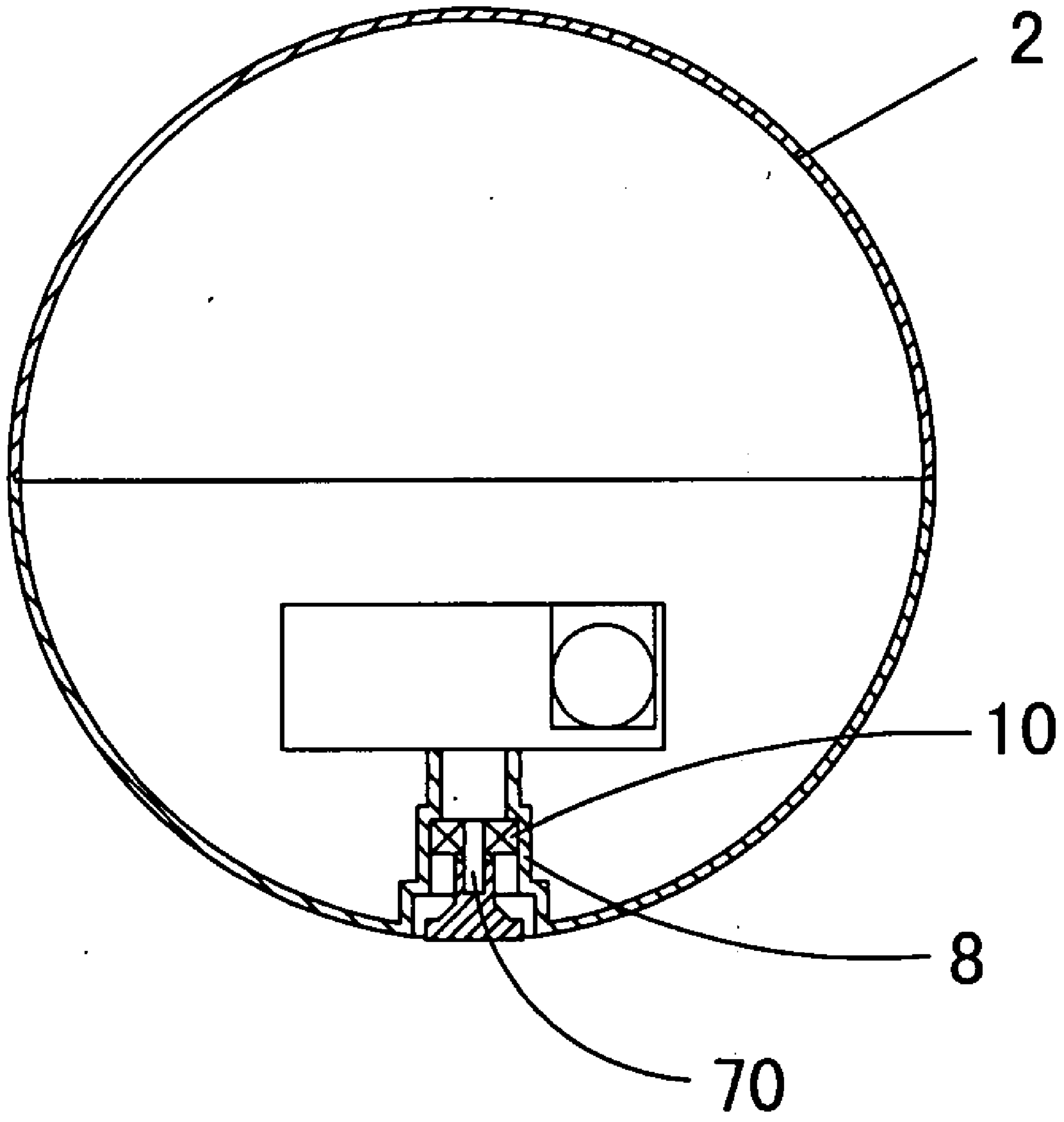
FIG. 12 is similar to FIG. 11, but showing an automatic rotating decoration in accordance with a further embodiment of the present invention.

Referring to FIG. 12, in this embodiment, a bearing 10 is further disposed between the side wall of the transmission member 8 and the output shaft 70 thereby forming a rotating connection without contact between the rotating body 2 and the output shaft 70 and ensuring the position relationship between the rotating body 2 and the output shaft 70. The bearing 10 may be a sliding bearing or a rolling bearing. The inner ring of the bearing 10 is fixed to the output shaft 70 and the outer ring of the bearing 10 is fixed to the side wall of the transmission member 8.

Figure 13:
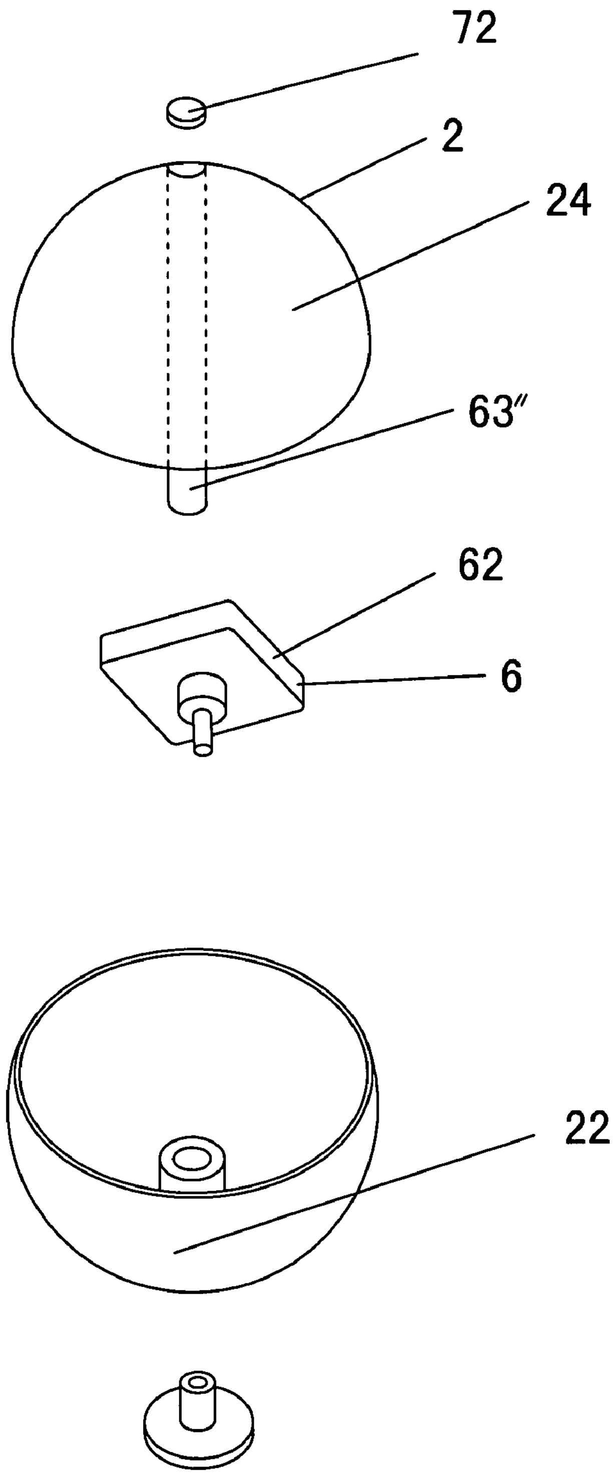
FIG. 13 is an exploded view of an automatic rotating decoration in accordance with a further embodiment of the present invention.
Figure 14:
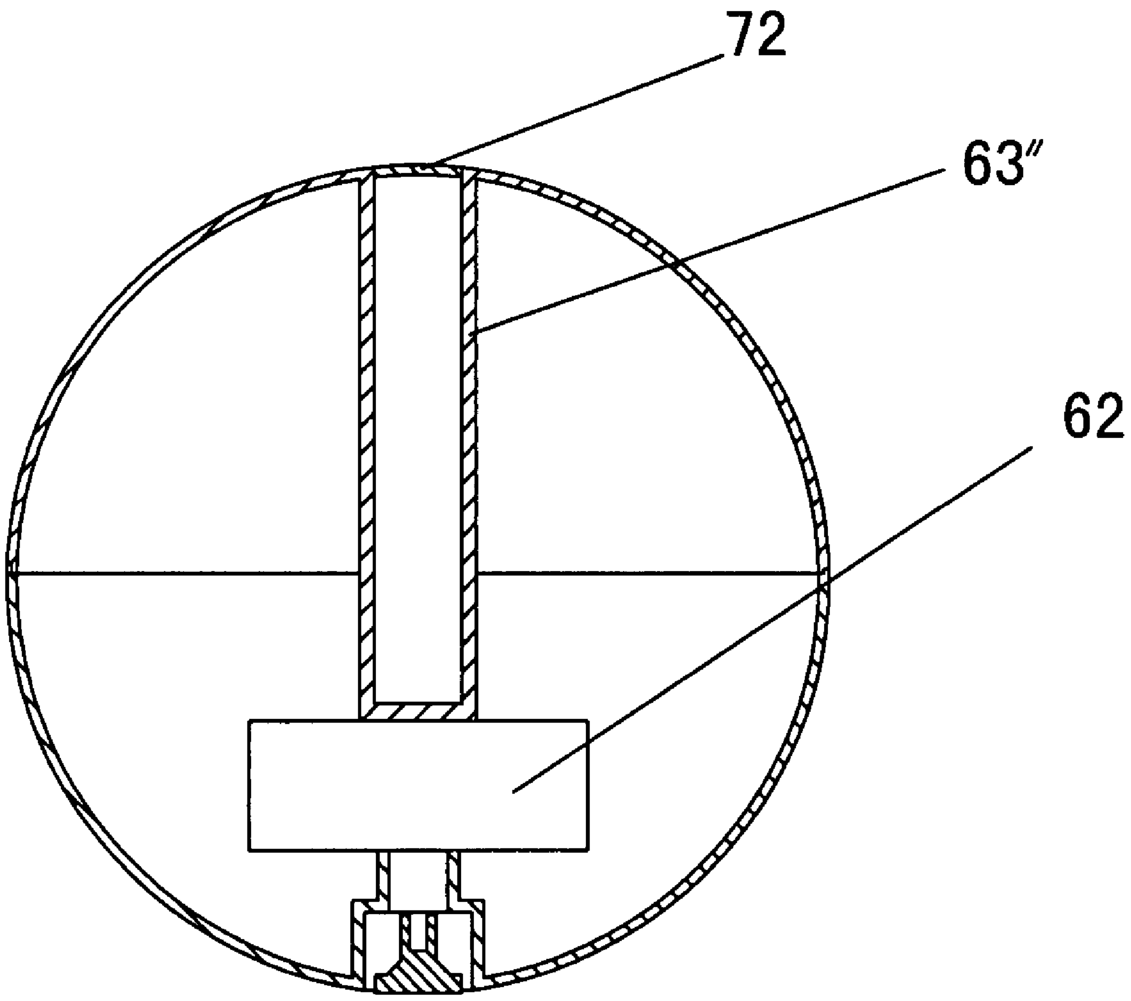
FIG. 14 is a cross sectional view of an assembly of FIG. 13.

Referring to FIGS. 13 and 14, in this embodiment, a battery seat 63" of the driving device 6 is disposed in the rotating body 2. The battery seat 63" may be configured as a conventional battery seat. A cover 72 is disposed at the junction of the rotating body 2 and the battery seat 63" for facilitating to open the cover to replace battery. The cover 72 connects the battery seat 63" in a conventional manner. The battery seat 63" electrically connects the motor body 62 of the driving device 6 for providing power to the driving device. In this embodiment, since the rotating body is not required to open for replacing battery, the first and second casings 22, 24 can be undetachably fixed.

In an alternative embodiment, a switch is electrically disposed between the battery seat and the motor body. The switch is a conventional steel ball contact switch.

As described above, the automatic rotating decoration of the present invention may automatically rotate around the support on another object without additional housing thereby simplifying the structure of the automatic rotating decoration, increasing fun of the automatic rotating decoration and facilitating the handling. The output shaft of the driving device directly connects the support and the driving body connects the transmission member, which further simplifies the structure of the automatic rotating decoration and facilitates to reduce cost.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An automatic rotating decoration comprising:

a rotating body with an opening being defined therein;

a support exposed to the opening;

a driving device connecting the support, the driving device including a driving body and an output shaft extending from the driving body, the driving body including a motor body and a battery seat electrically connecting the motor body; and a transmission member connecting the driving device and the rotating body, the support, the driving device and the transmission member all being received in the rotating body, wherein the rotating body includes a first casing, and a second casing connecting the first casing for receiving the driving device and the transmission member therein; the rotating body is a globe; the support slightly protrudes from the opening with the protruding outer surface substantially forming a portion of the outer surface of the rotating body thereby achieving completeness of the outer surface of the rotating body; the driving body fixedly connects the transmission member, and the output shaft of the driving device fixedly connects the support; the support is received in the opening with no contact, a fixing hole is disposed in the support for fixedly receiving the output shaft of the driving device, a protrusion is disposed at the motor body facing the support, the protrusion is fixed to the transmission member which is cylindrical with a through hole defined therein for receiving the protrusion, and the output shaft extends through the protrusion and is fixed to the support.

2. The automatic rotating decoration of claim 1, wherein and a steel ball contact switch is electrically disposed between the battery seat and the motor body.

* * * * *